United States Patent [19]

Herndone

[11] Patent Number: 4,667,903

[45] Date of Patent: May 26, 1987

[54] EJECTION SEAT HAVING ROLL THRUSTERS WITH PROPELLANT CHAMBERS IN THE INNER CATAPULT TUBES

[75] Inventor: Gerald F. Herndone, Bellevue, Wash.

[73] Assignee: The Boeing Company, Seattle, Wash.

[21] Appl. No.: 655,893

[22] Filed: Sep. 28, 1984

[51] Int. Cl.⁴ .............................................. B64D 11/06
[52] U.S. Cl. ........................ 244/122 A; 244/122 AB; 244/141
[58] Field of Search ................ 244/122, 4 A, 52, 169, 244/141, 137 P

[56] References Cited

U.S. PATENT DOCUMENTS

| | | | |
|---|---|---|---|
| 2,755,042 | 7/1956 | Paddon | 244/122 AC |
| 2,996,272 | 8/1961 | Scott et al. | 244/122 |
| 3,079,111 | 2/1963 | Throp | 244/122 |
| 3,186,662 | 6/1965 | Martin | 244/122 |
| 3,190,589 | 6/1965 | Mennborg | 244/122 |
| 3,270,991 | 9/1966 | Martin | 244/122 |
| 3,362,662 | 1/1968 | McIntyre et al. | 244/122 |
| 3,417,947 | 12/1968 | Valentine | 244/122 R |
| 3,433,440 | 3/1969 | Stanley | 244/137 |
| 3,442,473 | 5/1969 | Rivedal et al. | 244/122 |
| 3,481,568 | 12/1969 | McIntyre et al. | 244/122 |
| 3,554,472 | 1/1971 | McIntyre et al. | 244/122 |
| 3,679,157 | 7/1972 | Roberts et al. | 244/141 |
| 3,802,651 | 4/1974 | Axenborg et al. | 244/122 |
| 3,833,191 | 9/1974 | Morton | 244/122 |
| 3,847,329 | 11/1974 | Stanley | 244/122 |
| 3,885,452 | 5/1975 | Weinstock et al. | 89/1.807 |
| 3,912,203 | 10/1975 | DeStefano et al. | 244/122 |
| 3,979,088 | 9/1976 | McCormick | 244/122 |
| 3,979,089 | 9/1976 | Miller et al. | 244/122 |
| 4,017,040 | 4/1977 | Dillinger et al. | 244/3.22 |
| 4,036,456 | 7/1977 | Skinner et al. | 244/122 |
| 4,216,928 | 8/1980 | Hooper et al. | 244/122 |
| 4,236,687 | 12/1980 | Stone et al. | 244/122 |

Primary Examiner—Galen Barefoot
Assistant Examiner—Mark R. Valliere
Attorney, Agent, or Firm—Eugene O. Heberer

[57] ABSTRACT

An ejection seat (10) having roll thrusters (38, 40, 112, 114) and propellant chambers in the inner catapult tubes (44, 46, 124, 126). The roll thrusters (38, 40, 112, 114) are adapted to roll the seat (10), when ejected from an inverted or unsatisfactory attitude to an upright proper attitude. Solid propellants (44, 46, 128, 130) within the inner catapult tubes are to be ignited after the seat is being ejected. There is a roll thruster valve housing (36, 110) connected to both roll thruster nozzles (38, 40, 112, 114) and to both inner catapult tubes (24, 26, 124, 126) so that propellant gas may flow from both catapult tubes to both nozzles. The check valve (52) in each inner catapult is operable to open during ejection by ejection gas and is operable to close by the roll thruster gas when the roll thruster propellants are ignited. The check valve system modulates the catapult gas pressure during ejection, prior to roll thruster propellant ignition.

17 Claims, 7 Drawing Figures

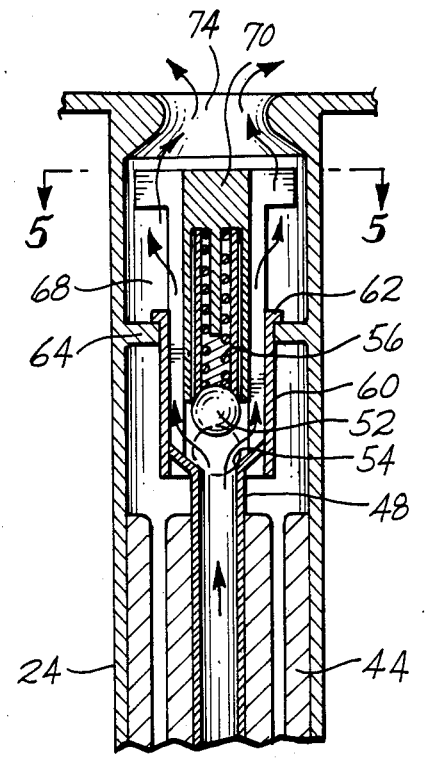
Fig. 4
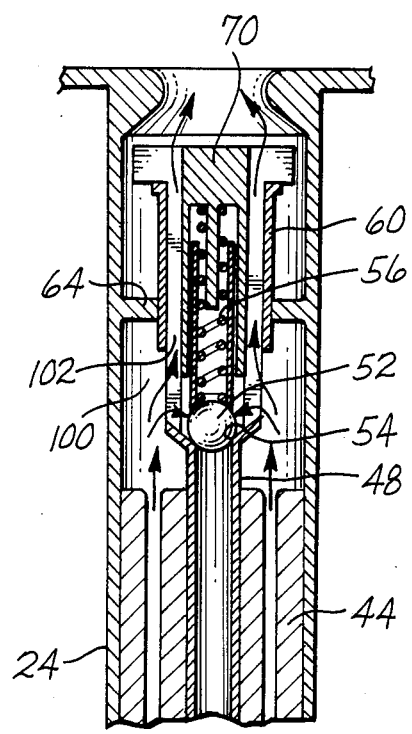
Fig. 6
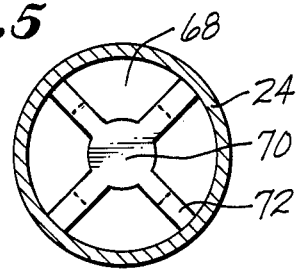
Fig. 5
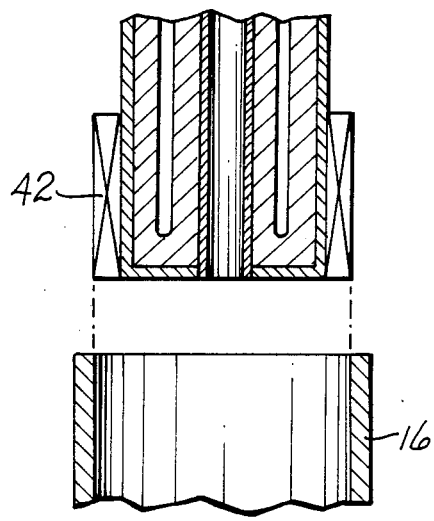

EJECTION SEAT HAVING ROLL THRUSTERS WITH PROPELLANT CHAMBERS IN THE INNER CATAPULT TUBES

DESCRIPTION

1. TECHNICAL FIELD

The invention relates to aircraft ejection seats, and more particularly, to ejection seats having roll thrusters for rolling the seat, when ejected, from an inverted or unsatisfactory attitude to an upright satisfactory attitude.

2. Background Art

Ejection seats currently being used in high performance military aircraft have not kept pace with the advancements in aircraft performance and tactics, with the result being an increasing incidence of ejection related casualties, comprising severe injuries and deaths.

As a result there has been a manifest need for ejection seats which can successfully separate and recover a crew member from a stricken aircraft, in which the seat and occupant are in an adverse attitude or acceleration regime. One of the requirements, absent in the prior art, is the provision of an ejection seat having reliable capability of being rolled from an inverted to an upright attitude.

A seach of the patent literature discloses ejection seats of general interest as follows:

| | |
|---|---|
| U.S. Pat. No. 2,996,272 | Stott et al |
| U.S. Pat. No. 3,079,111 | Throp |
| U.S. Pat. No. 3,186,662 | Martin |
| U.S. Pat. No. 3,190,589 | Mennborg |
| U.S. Pat. No. 3,270,991 | Martin |
| U.S. Pat. No. 3,362,662 | McIntyre et al |
| U.S. Pat. No. 3,433,440 | Stanley |
| U.S. Pat. No. 3,442,473 | Rivedal et al |
| U.S. Pat. No. 3,481,568 | McIntyre et al |
| U.S. Pat. No. 3,554,472 | McIntyre et al |
| U.S. Pat. No. 3,648,955 | |
| U.S. Pat. No. 3,679,157 | Roberts et al |
| U.S. Pat. No. 3,802,651 | Axenborg et al |
| U.S. Pat. No. 3,833,191 | Morton |
| U.S. Pat. No. 3,847,329 | Stanley |
| U.S. Pat. No. 3,861,625 | |
| U.S. Pat. No. 3,885,452 | Weinstock et al |
| U.S. Pat. No. 3,912,203 | DeStefano et al |
| U.S. Pat. No. 3,979,088 | McCormick |
| U.S. Pat. No. 3,979,089 | Miller et al |
| U S. Pat. No. 4,017,040 | Dillinger et al |
| U.S. Pat. No. 4,036,456 | Skinner et al |
| U.S. Pat. No. 4,216,928 | Hooper et al |
| U.S. Pat. No. 4,236,687 | Stone et al |

DISCLOSURE OF THE INVENTION

According to the invention, it has been determined that in order to roll a seat and occupant from an inverted to an upright attitude, as rapidly as possible, a set of roll thrusters should be mounted on the seat at a location the greatest distance from the seat/occupant center of gravity. It has also been determined that it would be difficult and inefficient to route hot gas from a main rocket manifold located low on the seat to the top of the headrest structure, which is the farthest point from the center of gravity. It was decided that it would be desirable to locate a separate propellant charge adjacent to the roll thruster nozzles but because the space around the headrest is limited, trying to find a place to stow a propellant container was a serious problem.

The invention includes the discovery of an advantageous location for roll thruster propellant containment that solves the space limitation problem as well as combining several functions into a single device for minimizing structural weight. According to the invention, the roll thruster propellant is stored in the inner catapult tubes which are ejected with the seat and which in the past have been empty. The inner catapult tubes are connected together adjacent their attachment fittings and a servovalve housing for roll thrusters provides a common gallery for the roll thruster propellant charges in the inner catapult tubes. The inner catapult tubes have their outer ends secured to respective opposite sides of an outer end of an ejection seat adjacent a headrest. The propellants are positioned within the inner catapult tubes to be ignited after the seat is being ejected, that is, during the ejection or thereafter. A roll thruster nozzle is connected to a respective inner catapult tube on each side of the seat adjacent the outer end of the tube and a roll thruster valve housing is connected to both roll thruster nozzles and to both inner catapult tubes so that propellant gas may flow from both catapult tubes to both nozzles.

Roll thruster valve means in the valve housing are operable to fix or determine the thrust from the nozzles to roll the seat into the proper attitude after ejection.

In one embodiment there are two servovalves, one for each respective nozzle. There is a servo control module functioning to operate valve actuators, which may be in the form of a solenoid to move the valve as the solenoid extended or retracted, or similarly, may be a hydraulic piston which could move the valve from an open to a closed position and return as necessary.

In the first embodiment the inner catapult tubes have a passage through the roll thruster propellants to allow for seat ejection gas to pass therethrough to the valve housing during ejection. This makes it possible for the valves to modulate the catapult gas pressure during ejection, prior to roll thruster propellant ignition. Check valves are in each of the ejection gas passages and are operable to open during ejection and are closed by the roll thruster gas when the roll thruster propellants are ignited.

Prior to ignition of the roll thruster propellants, sleeves surround the check valves to form a part of the passage for the catapult ejection gas during the ejection. The sleeves are slidable to be lifted away from the check valves by roll thruster propellant gas and when that occurs the check valves are exposed to roll thruster gas so that they are closed to shut off the passages to the ejection gas, and the roll thruster gas is then directed to the roll thruster valve housing.

In a second embodiment, there is a servovalve having a single slidable stem and a plug on each end and having three operative positions. One position is between the nozzles so that both are open and no roll of the seat would occur because this position of the valve would yield equal and opposite thrust vectors with a zero net roll thrust. The other two positions of the valve is to have one of the nozzles closed or more closed than the other. When the nozzle on one side is closed, all of the thrust would be through the open nozzle, and the seat would roll in the direction opposite that thrust. If one of the nozzles was open more than the other then there would be a differential thrust level from side to side and the seat would be controlled as necessary by changing the thrust levels or maintaining the seat in its proper attitude without change. This maneuvering by thrust from the nozzles occurs during a very short period of time during which the attitude of the seat is made upright. The two propellant charges in the two tubes may be ignited simultaneously or sequentially depending upon the roll thrust requirements.

Further advantages of the invention may be brought out in the following part of the specification wherein the details have been described for the competence of the disclosure, without intending to limit the scope of the invention which is set forth in the appended claims.

BRIEF DESCRIPTION OF THE DRAWINGS

Referring to the accompanying drawings which are for illustrative purposes:

FIG. 4 is a cross-sectional view of an inner catapult tube during ejection, illustrating the venting of ejection gas to the roll thrusters;

FIG. 5 is a view taken substantially along the lines 5—5 of FIG. 4;

FIG. 6 is a cross-sectional view of an inner catapult tube just after ejection and after the propellants in the tube have been ignited to roll thrusting purposes.

BEST MODE FOR CARRYING OUT THE INVENTION

Figure 1:
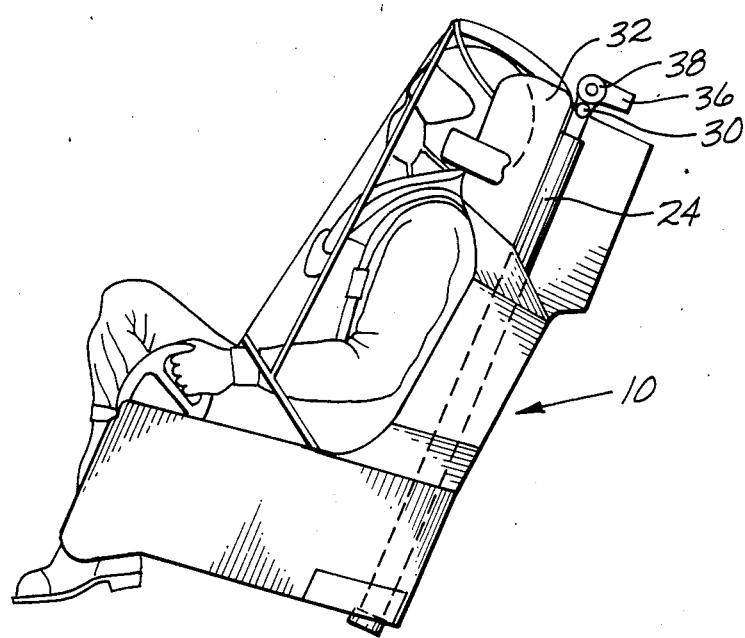
FIG. 1 is a side elevational view of an ejection seat which has been ejected and which is in an upright attitude.
Figure 2:
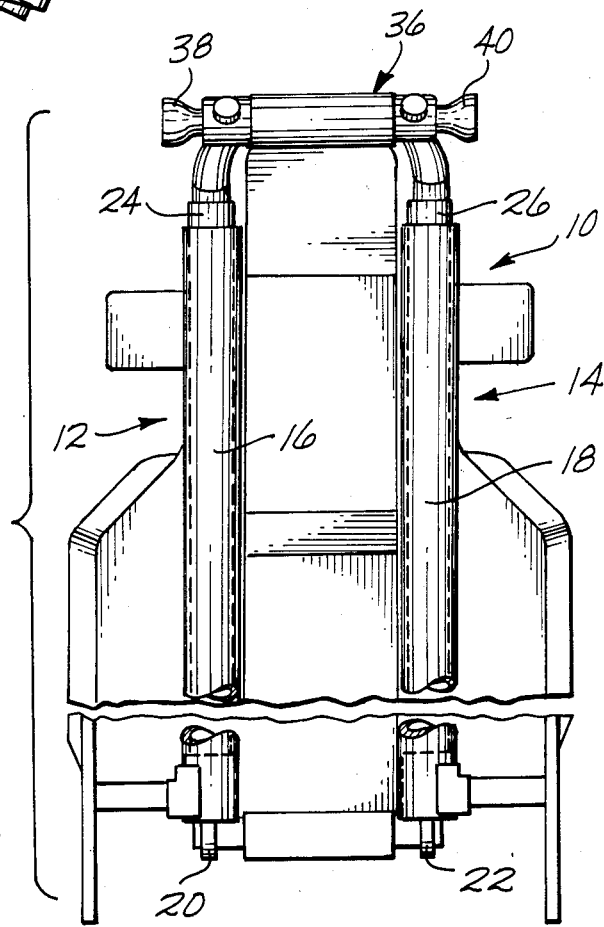
FIG. 2 is a rear elevational view of the ejection seat shown in FIG. 1, partially cutaway, which has not been ejected so as to illustrate the inner and outer catapult tubes.

Referring again to the drawings, there is shown in FIG. 2 are rear view of an ejection seat 10 having two spaced ejection catapults 12 and 14, comprised of outer catapult tubes 16 and 18, adapted to be secured at their lower or inner ends 20 and 22 to aircraft structure, not shown. Slidably engaged within the outer tubes 16 and 18 are inner catapult tubes 24 and 26 having their outer ends, FIG. 1, secured as at 30 adjacent top of a headrest 32, the inner catapult tubes 24 and 26 being adapted to be ejected with the ejection seat 10 from an aircraft.

A servovalve housing 36 attached to the outer ends of the tubes 24 and 26 connects the tube interiors. At respective opposite ends of the housing 36 are roll thruster nozzles 38 and 40.

FIG. 1 illustrates the seat 10 in an upright attitude just after it has been ejected from an aircraft, leaving the outer catapult cylinders 16 and 18 within the aircraft, not shown. The roll thrusters 38 and 40 are mounted on a seat at a location the greatest distance from the seat/occupant center of gravity. This location of the roll thrusters is to provide the capability of rolling the seat from an inverted to an upright attitude as rapidly as possible.

Figure 3:
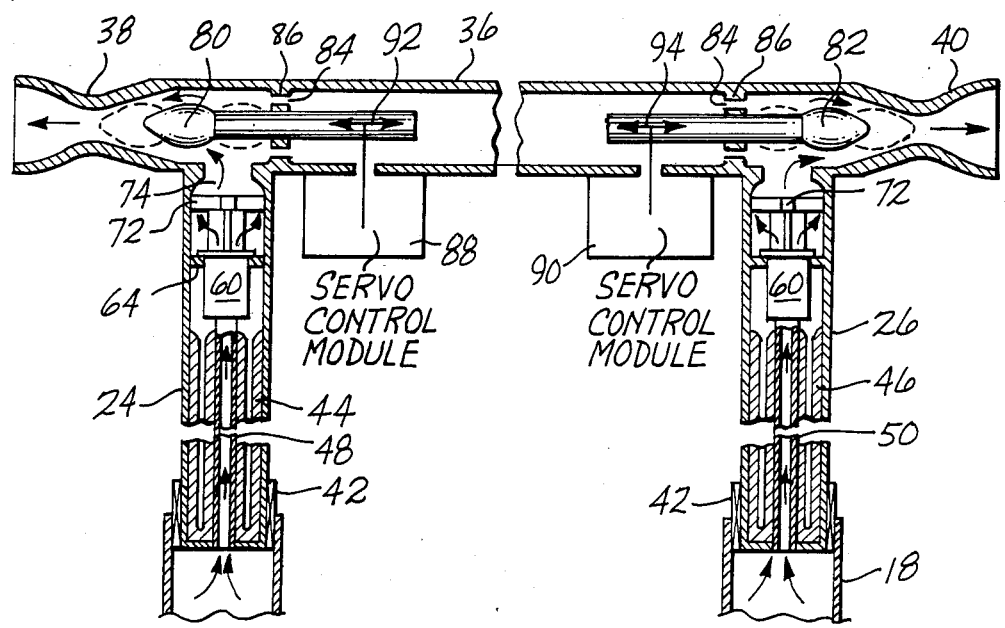
FIG. 3 is a fragmentary schematic view illustrating the operation of roll thrusters and inner and outer catapult tubes during ejection, during which ejection gas is vented through the roll thrusters.

In FIG. 3 the inner catapult tubes 24 and 26 along with the servovalve housing 36 are in the position of being ejected from the aircraft, along with the seat not shown, and the inner catapult tubes are shown carrying circumferential bearings 42, slidably engaged with the outer catapult tubes 16 and 18. The inner catapult tubes 24 and 26 would normally be empty but according to the invention have solid propellants 44 and 46 therein. The propellants are of generally cylindrical configuration having an annular inner groove between the inner and outer annular portions. The propellants are adapted to fit around pressure relief tubes 48 and 50 which provide a passage from the outer catapult tubes to a normally closed check valve 52, FIG. 4, in the upper part of the inner catapult tubes adapted to be held on its seat 54 by a spring 56.

As shown in FIGS. 3–6, a passage above the tube 48, during normal situations is continued above the check valve through a sleeve 60 having an annular flange 62 supported on annularly spaced supports 64. As indicated in FIG. 4, when the sleeve 60 is in a lower position, the passage continues in an annular area 68 around a central plug 70 supported by radially extending members 72 of the inner wall of the catapult cylinder. FIG. 3. Upwardly of the portion 68, the passage continues at 74 out of the inner catapult tube into the servovalve housing 36 past pintle valves 80 and 82 and out of the roll thruster nozzles 38 and 40.

The central portion of the valve housing is open to the passages and to the valves by means of openings 84 through the supports 86 in which the valves are slidably engaged. The valves are connected to servo control modules 88 and 90, operated by a microprocessor, not shown. Connected to each of the servo control modules are servovalve actuators 92 and 94, shown schematically. The actuators may be in the form of a solenoid or a hydraulic piston, for example. The solenoid or the piston can be directly connected to the valve so that as the solenoid would move in the direction of closing the valve it would push the valve and as it would be retracted it would withdraw the valve so that it would open. The amount of movement of the valve would be dependent upon the signal provided by the microprocessor to the servo control modules.

In FIG. 4, the arrows pointing upwardly from the outer catapult cylinder 16 indicate the flow of catapult ejection gas to the pressure relief tubes 48 and 50, upwardly to open the check valve 52 and from there passing outwardly through one or both of the nozzles. This arrangement is provided so that the servovalve system can modulate the catapult pressure during ejection, prior to roll thruster propellant ignition, so as to reduce catapult ejection pressure, if excessive in case of a light load in the seat for example, or in the event of a excessively high temperature which may occur as a result of an ambient temperature.

After ejection as shown in FIG. 6, and the roll thruster propellants 44 are ignited, the gas flows upwardly in the direction of the arrows exerting a pressure to cause the sleeve 60 to slide upwardly within the supports 64 and around the plug 70, to open annular area 100 to annular passage 102 around the check valve structure outwardly to the end of the catapult tube. The pressure caused by the roll thruster propellant gas acts against the check valve 52 to cause it to be seated so as to close off the passage 48.

The propellant charges may be ignited simultaneously or sequentially depending upon the roll thrust requirements. This is accomplished in a very short period automatically beyond the seat occupant's control. As may be seen from FIG. 3, if it is desired that the seat be rolled to the right the gas would be caused to move out of the roll thruster 38 by the opening of the valve 80 and the valve 82 would be closed. Under certain conditions one of the valves would be opened more than the other so as to provide a differential thrust level from side to side.

Figure 7:
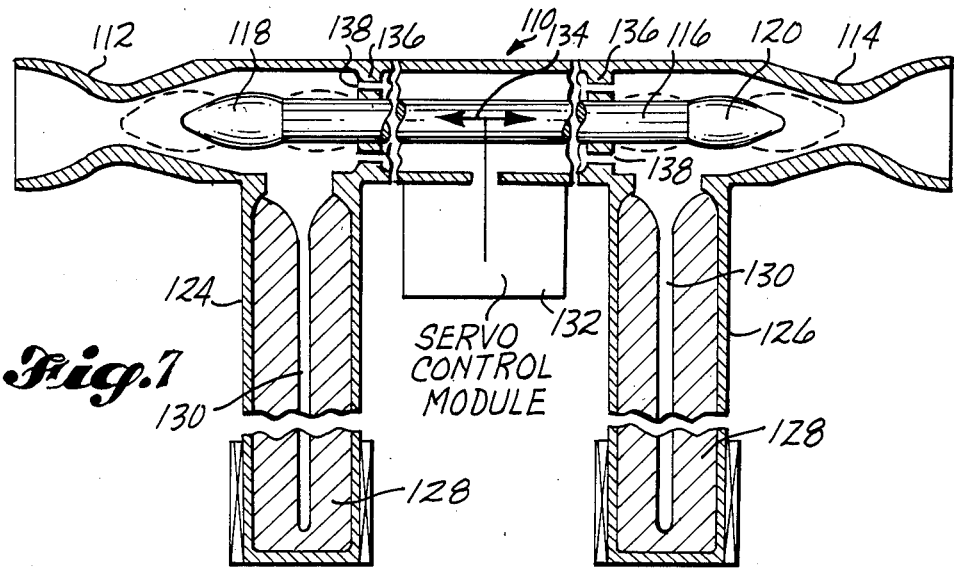
FIG. 7 is a fragmentary cross-sectional view illustrating another embodiment of the invention in which there is a double plug, single stem roll thruster servovalve for interconnecting the two thruster nozzle area controllers to deliver different thrust levels from side to side, which in the central position shown would yield equal and opposite thrust vectors with a zero net roll thrust.

Another and simpler embodiment of the invention is shown in FIG. 7. Here, a roll thruster valve housing 110, having roll thrusters nozzles 112 and 114, has a single stem 116 and double plug valves 118, 120, only one of which can be closed at one time. Connected to the nozzle 112 is an inner catapult tube 124 and connected to the nozzle 114 is an inner catapult tube 126. In each of the inner catapult tubes there is a roll thruster propellant 128 being of an external cylindrical configuration and having a central bore 130 for fast burning.

Again, the valves 118, 120 are operated by a servo module as 132 and an actuator 134 shown schematically. The valve stem is slidably engaged in supports 136 which have passages 138 therethrough. The servovalves 118, 120 thus interconnect the two roll thruster nozzles to deliver differential thrust levels from side to side as required to roll the seat to achieve the proper attitude. A central position of the valve, as shown, yields equal and opposite thrust vectors with a zero net roll thrust. Again, the two propellant charges are ignited simultaneously or sequentially depending upon the roll thrust requirements. The pressure on both sides of the valves is always the same because of the openings 138 in the valve stem supports 136.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. An ejection seat having roll thrusters for rolling the seat, when ejected, from an inverted or unsatisfactory attitude to an upright proper attitude, comprising:
    two inner catapult tubes having their outer ends secured adjacent respective opposite sides of and adjacent an outer end of an ejection seat;
    two outer catapult tubes in which the inner catapult tubes are slidably engaged,
    means for ejection of the seat by ejection gas disposed within the outer catapult tubes,
    roll thruster propellants positioned within the inner catapult tubes to be ignited after the seat is being ejected by said ejection gas in said outer catapult tubes;
    a roll thrust nozzle connected to a respective inner catapult tube on each side of the seat adjacent the outer end of the tube at the greatest distance from the seat/occupant center of gravity;
    a roll thruster valve housing connected to both roll thrust nozzles and to both inner catapult tubes so that roll thruster propellant gas may flow from both catapult tubes to both nozzles;
    roll thruster valve means in the valve housing to fix the thrust from the nozzles to roll the seat into the proper attitude after ejection; and
    means connected to the valve housing to operate the valve means.

2. The invention according to claim 1 in which: the means to operate the valve means, positions the valve means to modulate the catapult gas pressure during ejection, prior to roll thruster propellant ignition.

3. The invention according to claim 1 in which: the inner catapult tubes have a passage through the roll thruster propellants to allow ejection gas to pass therethrough to the valve housing during ejection.

4. The invention according to claim 3 including:
    a check valve in each inner catapult, the check valve being operable to open during ejection by ejection gas pressure and being operable to close by the roll thruster gas pressure when the roll thruster propellants are ignited.

5. The invention according to claim 4 in which:
    said check valves are in the passages through the roll thruster propellants and are surrounded by a sleeve prior to ignition of the roll thruster propellants;
    the sleeves forming part of the passage for the ejection gas during ejection;
    the sleeves being slidable to be lifted away from the check valves by gas from the ignited roll thruster propellants;
    the check valves being exposed to roll thruster gas when the sleeves are lifted so that the check valves close the passages to the ejection gas, the roll thruster gas then being directed to the roll thruster valve housing.

6. The invention according to claim 5 in which:
    the valve means are two servovalves, one for each respective nozzle;
    said means to operate the valve means being servo control modules, one for each servovalve;
    each module being connected to a servovalve actuator to move a respective valve with respect to opening and closing its nozzle so as to modulate the catapult ejection pressures through the check valves to the nozzles during ejection, prior to roll thruster propellant ignition.

7. The invention according to claim 1 in which:
    said roll thruster valve means is slidable servovalve having one stem with a valve plug at each end and having three operative positions;
    a position being centrally between the nozzles to have both open the same amount to provide a zero net roll thrust;
    a position where one nozzle is open more than the other to deliver a differential thrust from side to side; and
    a position where one nozzle is completely closed and the other is completely open to roll the seat in the direction opposite the thrust.

8. The invention according to claim 7 in which:
    said means to operate the valve means is a servo control module,
    the module being connected to a servovalve actuator to move the servovalve to a position between the nozzles to have both nozzles open so as not to roll the ejected seat or to move the servovalve to close one of the nozzles and produce a thrust therethrough to roll the seat away from the direction of the thrust during the ignition of the propellants in the inner catapult tubes.

9. An ejection seat having roll thrusters for rolling the seat, when ejected, from an inverted or unsatisfactory attitude to an upright proper attitude, comprising:
    two inner catapult tubes having their outer ends secured adjacent an outer end of an ejection seat;

roll thruster propellants positioned within the inner catapult tubes to be ignited to generate roll thruster gas pressure after the seat is being ejected;

a roll thruster nozzle connected to a respective inner catapult tube adjacent the outer end of the tube;

a roll thruster valve housing connected to both roll thruster nozzles and to both inner catapult tubes so that roll thruster propellant gas may flow from both catapult tubes to both nozzles;

roll thruster valve means in the valve housing to fix the thrust from the nozzles to roll the seat into the proper attitude after ejection; and means connected to the valve housing to operate the valve means;

the inner catapult tubes having a passage through the roll thruster propellants to allow ejection gas to pass therethrough to the valve housing during ejection.

10. The invention according to claim 9 in which:
the means to operate the roll thruster valve means positions the valve means to modulate the ejection gas pressure during ejection, prior to roll thruster propellant ignition.

11. The invention according to claim 9 including:
valve means in each inner catapult, being operable to open during ejection by ejection gas pressure and being operable to close by the roll thruster gas pressure when the roll thruster propellants are ignited.

12. The invention according to claim 11 in which:
said valve means in each inner catapult are check valves;
said check valves are in the passages through the roll thruster propellants and are surrounded by a sleeve prior to ignition of the roll thruster propellants;
the sleeves forming part of the passage for the ejection gas during ejection;
the sleeves being slidable to be lifted away from the check valves by gas from the ignited roll thruster propellants;
the check valves being exposed to roll thruster gas when the sleeves are lifted so that the check valves close the passages to the ejection gas, the roll thruster gas then being directed to the roll thruster valve housing.

13. The invention according to claim 9 in which:
the roll thruster valve means are two servovalves, one for each respective nozzle;
said means to operate the valve means being servo control modules, one for each servovalve;
each module being connected to a servovalve actuator to move a respective valve with respect to opening and closing its nozzle so as to modulate the catapult ejection gas pressures through the check valves to the nozzles during ejection, prior to roll thruster propellant ignition.

14. The invention according to claim 9 in which:
said roll thruster valve means is a slidable servovalve having one stem with a valve plug at each end and having three operative positions;
a position being centrally between the nozzles to have both open the same amount to provide a zero net roll thrust;
a position where one nozzle is open more than the other to deliver a differential thrust from side to side; and
a position where one nozzle is completely closed and the other is completely open to roll the seat in the direction opposite the thrust.

15. The invention according to claim 14 in which:
said means to operate the valve means is a servo control module,
the module being connected to a servovalve actuator to move the servovalve to a position between the nozzles to have both nozzles open so as not to roll the ejected seat or to move the servovalve to close one of the nozzles and produce a thrust therethrough to roll the seat away from the direction of the thrust during the ignition of the propellants in the inner catapult tubes.

16. The invention according to claim 1 including:
means in the inner catapult tubes to allow ejection gas to pass therethrough to the valve housing during ejection.

17. The invention according to claim 16 including:
valve means in each inner catapult, being operable to open during ejection by ejection gas pressure and being operable to close by the roll thruster gas pressure when the roll thruster propellants are ignited.

* * * * *

UNITED STATES PATENT AND TRADEMARK OFFICE
CERTIFICATE OF CORRECTION

PATENT NO. : 4,667,903

DATED : May 26, 1987

INVENTOR(S) : Gerald F. Herndon

It is certified that error appears in the above-identified patent and that said Letters Patent are hereby corrected as shown below:

On the Title Page:
In the heading on page 1, the inventor's name "Herndone" should read -- Herndon --.

In the introductory section of the patent, following "Inventor: " the name should read -- Gerald F. Herndon, Column 1, line 27, "seach" should be -- search --.

Column 3, line 32, "to" should be -- for --.

Claim 1, column 5, line 56, "roll thrust" should be -- roll thruster --.

Claim 1, column 5, lines 60 and 61, "roll thrust" should be -- roll thruster --.

Signed and Sealed this

Eighth Day of September, 1987

Attest:

DONALD J. QUIGG

*Attesting Officer*    *Commissioner of Patents and Trademarks*